(12) United States Patent
Wiechers

(10) Patent No.: US 7,305,416 B2
(45) Date of Patent: Dec. 4, 2007

(54) NETWORK ASSEMBLY AND METHOD FOR INSERTING AN IDENTIFICATION CODE

(75) Inventor: Alejandro Wiechers, Jalisco (ME)

(73) Assignee: Hewlett-Packard Development Company, L.P., Houston, TX (US)

( * ) Notice: Subject to any disclaimer, the term of this patent is extended or adjusted under 35 U.S.C. 154(b) by 1280 days.

(21) Appl. No.: 09/747,219

(22) Filed: Dec. 18, 2000

(65) Prior Publication Data

US 2002/0078053 A1 Jun. 20, 2002

(51) Int. Cl.
*G06F 7/00* (2006.01)
*G06F 17/00* (2006.01)

(52) U.S. Cl. ..................................... 707/104.1; 707/10

(58) Field of Classification Search ................ 709/217; 707/10; 713/163, 200, 201; 705/40
See application file for complete search history.

(56) References Cited

U.S. PATENT DOCUMENTS

| | | | |
|---|---|---|---|
| 4,153,931 A | | 5/1979 | Green et al. |
| 4,717,971 A | * | 1/1988 | Sawyer .......................... 386/55 |
| 5,214,696 A | | 5/1993 | Keiser, II et al. |
| 5,465,213 A | | 11/1995 | Ross |
| 5,496,071 A | | 3/1996 | Walsh |
| 5,782,598 A | | 7/1998 | Salzberger |
| 5,832,499 A | * | 11/1998 | Gustman ................ 707/103 R |
| 5,986,690 A | | 11/1999 | Hendricks |
| 6,035,308 A | | 3/2000 | Yano et al. |
| 6,119,108 A | * | 9/2000 | Holmes et al. ................ 705/40 |
| 6,311,214 B1 | * | 10/2001 | Rhoads ........................ 709/217 |
| 6,327,594 B1 | * | 12/2001 | Van Huben et al. ......... 707/200 |
| 6,385,606 B2 | * | 5/2002 | Inohara et al. .................. 707/4 |
| 6,434,607 B1 | * | 8/2002 | Haverstock et al. ......... 709/217 |
| 6,463,533 B1 | * | 10/2002 | Calamera et al. ............ 713/163 |
| 6,522,770 B1 | * | 2/2003 | Seder et al. ................. 382/100 |
| 6,542,927 B2 | * | 4/2003 | Rhoads ........................ 709/217 |
| 6,633,877 B1 | * | 10/2003 | Saigh et al. ................... 707/10 |
| 6,650,761 B1 | * | 11/2003 | Rodriguez et al. ........... 382/100 |

FOREIGN PATENT DOCUMENTS

| | | |
|---|---|---|
| WO | WO00/62203 A1 | 10/2000 |
| WO | WO01/13267 A1 | 2/2001 |

* cited by examiner

*Primary Examiner*—Susan Y. Chen

(57) ABSTRACT

A network assembly and associated method for assigning an identification code to an electronic file includes a reference repository, an indexing unit linked with the reference repository, and an editing unit linked with the reference repository and the indexing unit. The reference repository receives the electronic file from a communications network, such as the Internet, and stores characteristic information associated with the electronic file. The indexing unit assigns and stores an identification code with respect to the characteristic information. The editing unit inserts the identification code to the electronic file in a format suitable for the electronic file. The network assembly further includes a review unit linked with the editing unit for reviewing the inserted identification code before dispatching the electronic file from the network assembly.

15 Claims, 5 Drawing Sheets

NETWORK ASSEMBLY AND METHOD FOR INSERTING AN IDENTIFICATION CODE

FIELD OF THE INVENTION

This invention relates to an assembly and method for inserting an identification code on an electronic file or "efile". More particularly, this invention relates to inserting a library specific identification code on published material such as efile books and periodicals, for example.

BACKGROUND OF THE INVENTION

The publishing industry distributes published material to consumers primarily through highly structured channels of distribution. For example, a "bulk" distribution channel is commonly referred to in the industry as a distribution outlet for large quantities of published material, such as retail stores, book stores, and book wholesalers whereas "library" distribution refers to distributing published material to various libraries, public and/or private. It should be added that in this application and the appended claims the term "published material" is defined as an authored work for distribution, such as books, magazines, newspapers, and multimedia publications, for example.

Illustratively, because each library collection is often unique, nearly every library maintains a specific format for cataloging books in the library. A library specific identification code is inserted on each item in the library for purposes of cataloging, as well as tracking, the availability and location of that item in the library system. Often a library identification code will feature a library specific classification code and a library specific identification code. The library specific classification code will include a numerical or alphabetical index of the item according to subject matter, author or title. On the other hand, the library specific inventory code typically features a numerical index indicating the relationship of one item to a number of identical items offered by that specific library.

For example, a copy of the book "Don Quixote" by Miguel de Cervantes is ordered by a library in Toledo, Ohio and in Toledo, Spain. The library in Ohio, already having two copies, may require a library identification code of "CSPNLIT 3", with a library specific classification code of CSPNLIT signifying Spanish literature having an author beginning with the letter "C" and a library specific inventory code of 3 signifying that the new copy will be the third copy in that library. Alternatively, the Spanish library having 162 copies would require a library identification code of "FH 163p1" where the library specific classification code of FH represents the category of Historical Fiction and the library specific inventory code of 163p1 designating the item as the $163^{rd}$ copy to be shelved on the second floor of the library.

Currently, library distributors obtain an item of published material from a publisher and insert a library specific identification code on that item according to each library's rules for identification. A book, for example, will receive a library specific identification code on its spine and on a few predetermined pages in the book. Library distributors ship a customized item for receipt by a library ready to be inventoried and shelved. Because libraries purchase published materials from library distributors, library distributors must be able to track every item of published material within each purchasing library.

Various technologies in today's computer-based information revolution offer a window of opportunity for library distributors as well as for publishing companies and libraries to streamline established practices in the industry, especially distributing published material. From inception of an authored work to distribution of a resulting item of published material, the computer-based information revolution makes available virtually all currently generated information, text, visual, and audio, in an electronic file or efile format. Information, once exclusively available in printed form, such as books and magazines, is now accessible on electronic devices such as computers, video displays, and handheld devices, for example. Therefore, continuing with the example, the library in Ohio can now provide patrons access to "Don Quixote" in traditional printed book form as well as downloaded in an efile format to either the library's electronic device or a library patron's electronic device. A library system, however, is still obligated to track an efile just as with printed materials. Unfortunately, there is currently no known means for inserting a library specific identification code on an efile.

Thus, as a matter of saving cost, labor, and time, there is a need in the art for providing an identification code for an electronic file containing published material with a structured procedure similar to that of existing library distributors.

SHORT STATEMENT OF THE INVENTION

Accordingly, the present invention is directed to an assembly and method that can be used for inserting a library specific identification code on an electronic file. In one embodiment of the invention, a network assembly and associated method for assigning an identification code to an electronic file includes a reference repository, an indexing unit linked with the reference repository, and an editing unit linked with the reference repository and the indexing unit. The reference repository receives the electronic file from a communications network, such as the Internet, and stores characteristic information associated with the electronic file. The indexing unit assigns and stores an identification code with respect to the characteristic information. The editing unit inserts the identification code to the electronic file in a format suitable for the electronic file. The network assembly further includes a review unit linked with the editing unit for reviewing the inserted identification code before dispatching the electronic file from the network assembly. Preferably, the electronic file is published material for use by a library system. The network assembly inserts a library specific identification code prior to dispatching the electronic file in a format suitable for that library system.

Computer program code accompanies the network assembly for inserting an identification code. The computer program code includes code for storing characteristic information associated with the electronic file as well as for assigning an identification code to the electronic file with respect to the characteristic information. Code is also provided for inserting the identification code to the electronic file.

In a further embodiment of the present invention, a network assembly is apart from, but linked with a communications network through a network dialer, such as a modem, for example. This network assembly is an individual hardware unit linked with the communications network and a library system via software routines executed by a central logic unit provided by the network assembly.

In a still further embodiment of the present invention, a method for assigning and inserting an identification code to an electronic file is provided so that characteristic information is stored, an identification code is assigned, and the identification code is inserted to the electronic file.

DETAILED DESCRIPTION OF THE PREFERRED EMBODIMENTS

The preferred embodiments of the present invention are illustrated by way of example in FIGS. 1-5. With specific reference to FIG. 1, an identification code insertion system 10 includes a network assembly 30 linked with a communications network 20 and with a library system 40. The network assembly 30 receives an efile of published material from the communications network 20, inserts an identification code on the efile, and dispatches that efile to the library system 40. The network assembly 30 is configured for engagement with communication networks of a type well known in the industry, such as the Internet, for example. Accordingly, the communications network 20 preferably comprises an Internet communications network environment, but other embodiments contemplate an intranet communications environment.

Figure 1:
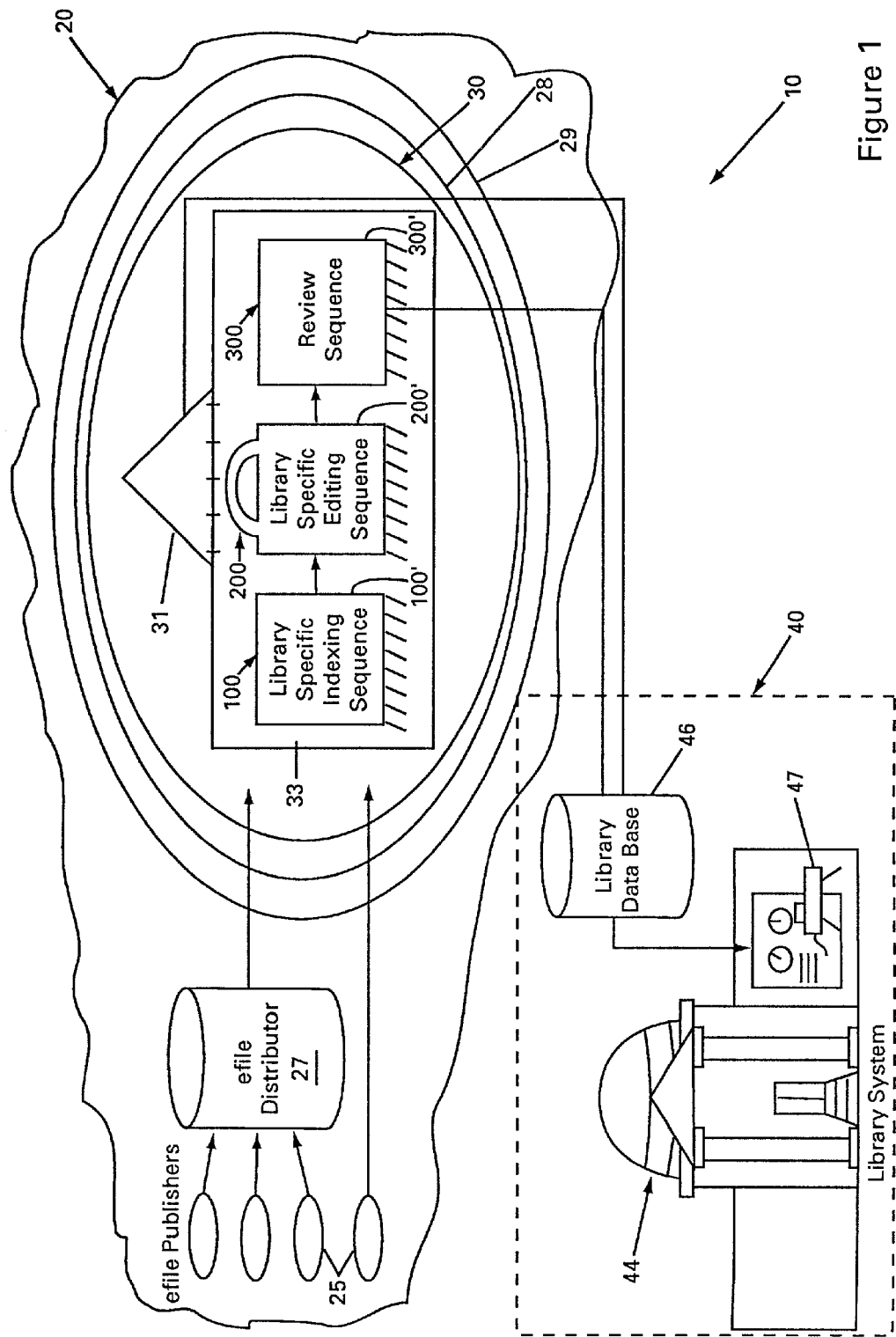
FIG. 1 is a schematic diagram of a preferred embodiment of the identification code insertion system of the present invention featuring a network assembly within a communications network.

In FIG. 1, the communications network 20 includes at least one efile publisher 25 for generating published materials, ultimately, for use by the library system 40. The network assembly 30 may access published materials via the communications network 20 directly from an efile publisher 25 or from an efile distributor 27 that receives published material from an array of efile publishers 25.

Preferably, the network assembly 30 is a location within the communications network 20, such as an Internet address or Universal Resource Locator (URL), for example. The network assembly 30 is linked with an address server 28. The address server 28 provides user-access to the network assembly 30. Shown in FIG. 1, the address server 28 is preferably connected with a browser 29 for facilitating access to the network assembly 30 through a graphical format. The browser 29 is of a type well known in the art, such as NETSCAPE NAVIGATOR or MICROSOFT EXPLORER, for example.

Figure 2:
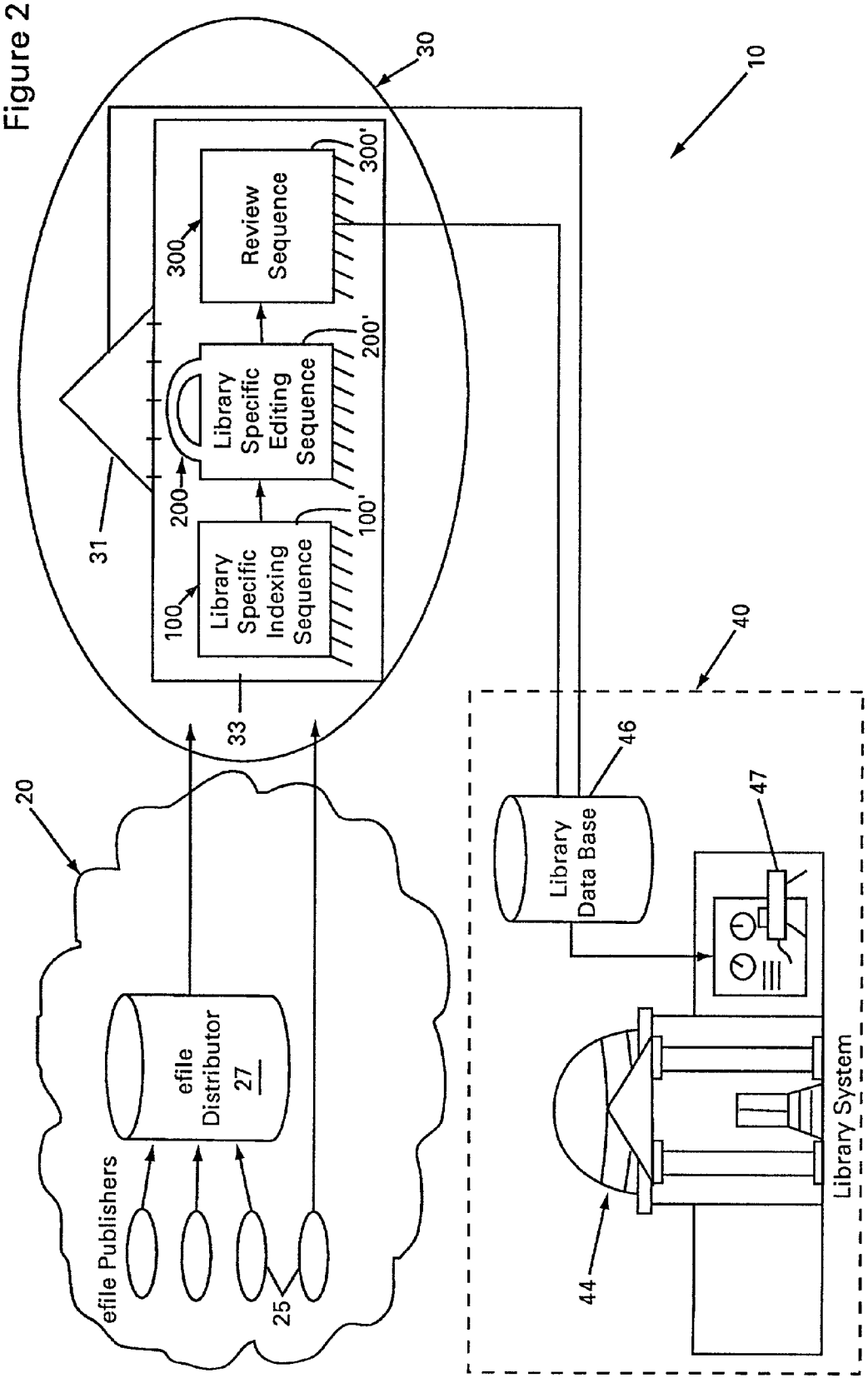
FIG. 2 is a schematic diagram of one embodiment of the identification code insertion system of the present invention featuring a network assembly apart from, but linked to a communications network.

Other embodiments of the identification code insertion system 10, however, do not incorporate a browser. For example, FIG. 2 illustrates one embodiment of an identification code insertion system 10 wherein a network assembly 30 is apart from, but linked with, a communications network 20 through a network dialer (not shown), such as a modem for example. As such, FIG. 2 contemplates the network assembly 30 as an individual hardware unit linked with the communications network 20 and a library system 40 via software routines executed by a central logic unit 31 provided by the network assembly 30. The hardware unit may be placed within a library or within a book on demand machine 47 as discussed below.

The network assembly 30 includes a reference repository 33. The reference repository 33 receives an efile containing published material from the communications network 20. The reference repository 33 stores the efile in temporary or "buffer" memory until the efile is dispatched from the network assembly 30. Additionally, the reference repository 33 receives characteristic information regarding each efile received. A central logic unit 31 linked with the reference repository 33 instructs the reference repository 33 to store the characteristic information in permanent memory. Permanently storing characteristic information enables the network assembly 30 to accurately account for the efile sent to a specific library system and, ultimately, the items within each library system.

"Characteristic information" is defined in this application and the appended claims as information related to each efile for use in inserting a library specific identification code on that efile, such as a title, author, publisher, a library specific format, copyright date, International Standard Book Number (ISBN), and number of pages, for example. Moreover, the term "library specific" refers to internal procedures uniquely applied by each library for operating that library. It must also be added that although it is preferably applied to library systems, the identification code insertion system 10 may be applied to other systems that require inserting an identification code to an electronic file, as those of ordinary skill will readily recognize, such as banking, accounting, sales, and other business systems, for example.

Still referring to FIG. 1, the network assembly 30 includes an indexing unit 100' linked with the reference repository 33, an editing unit 200' linked with the reference repository 33 and the indexing unit 100', and a review unit 300' linked with the editing unit 200' and with the reference repository 33. The central logic unit 31, in turn, is linked with the indexing unit 100', the editing unit 200', the review unit 300', and the reference repository 33. The central logic unit 31 enables the network assembly 30 to execute a computer program code for inserting a library specific identification code on an efile of published material as well as dispatching the efile. Accordingly, the indexing unit 100' implements an indexing sequence 100 shown in FIG. 3, the editing unit 200' implements an editing sequence shown in FIG. 4, and the review unit 300' implements a review sequence as shown in FIG. 5. In addition, FIG. 1 depicts the central logic unit 31 executing the program code exclusively for the network assembly 30. However, those of ordinary skill in the art will recognize that the central logic unit 31 in other embodiments may execute other operations besides the computer program code for the network assembly 30, such as implementing program sequences for other network addresses, for example.

It should be added that for the embodiment of FIG. 2 where the network assembly 30 is a hardware unit, the indexing sequence 100, the editing sequence 200, and the review sequence 300 are each executed by a processor or processors (not shown) within the hardware unit. These computer sequences then operate to accommodate operations within a particular library system in possession of such a hardware unit.

Figure 3:
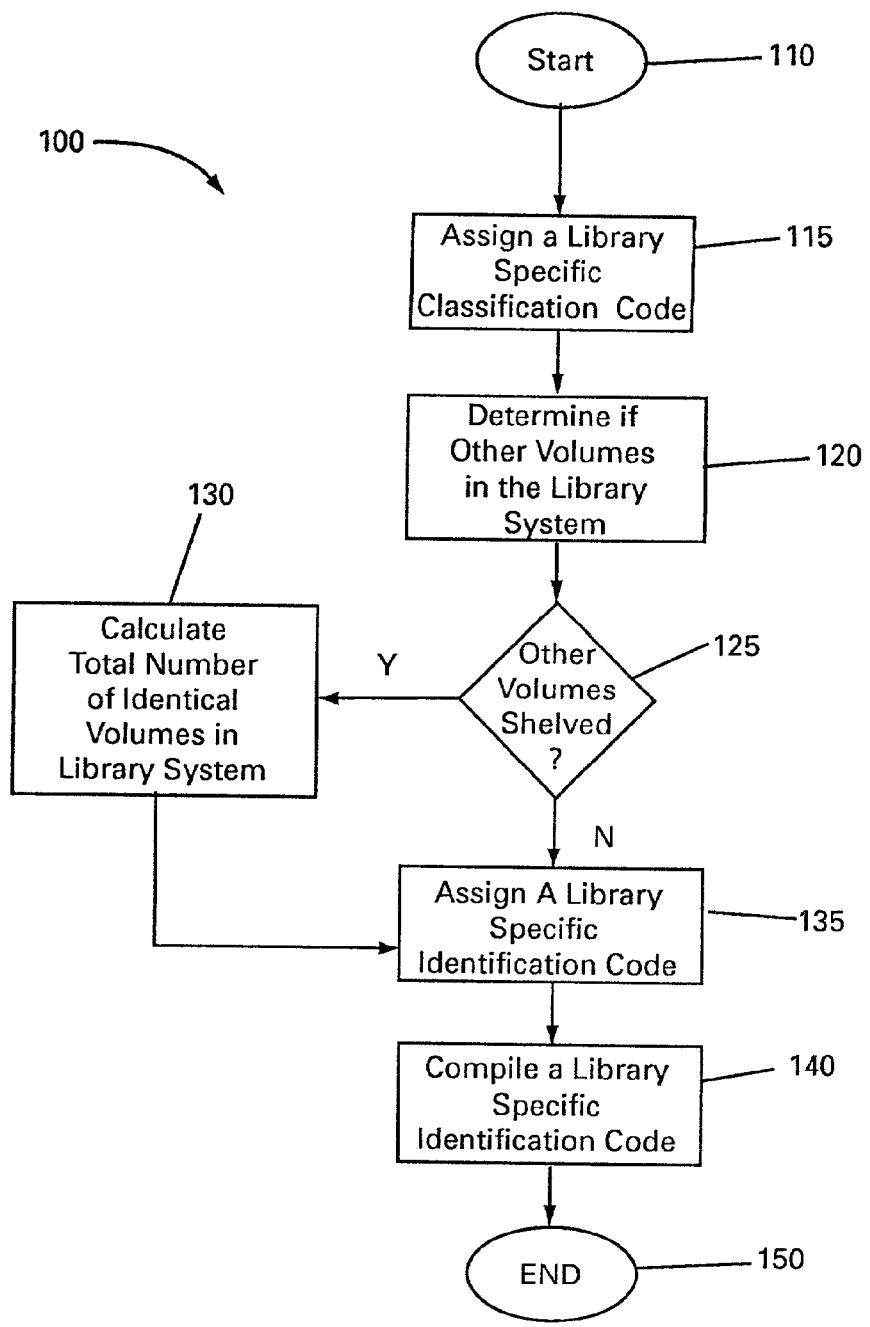
FIG. 3 is a schematic diagram of the indexing sequence executed by a network assembly of the identification code insertion system of FIG. 1.

Referring to FIGS. 1 and 3, the indexing unit 100' assigns a library specific identification code based on the associated characteristic information stored in the reference repository 33. In particular, the central logic unit 31 retrieves characteristic information from the reference repository 33 so as to enable the indexing unit 100', in step 110 of FIG. 3, to initiate the programmed indexing sequence 100. In step 115, a library specific classification code is assigned to the efile by the indexing unit 100'. For example, in the above mentioned Toledo, Ohio library, an efile of the "Don Quixote" book would be assigned the classification code of "CSPNLIT". By referring to the reference repository 33 and the library system 40, the central logic unit 31 in steps 120 and 125 determines whether identical copies of the efile are already in the library system 40. If identical copies exist, the central logic unit in step 130 calculates a total number of identical efile copies in the particular library system 40 before advancing to step 135. In step 135, the indexing unit 100' assigns a library specific inventory code. Continuing the above example, the inventory code of "3" is assigned. Before the indexing sequence ends in step 150, the library specific identification code is compiled in step 130 by combining the assigned classification code and the inventory code in an order required the library system 40.

Figure 4:
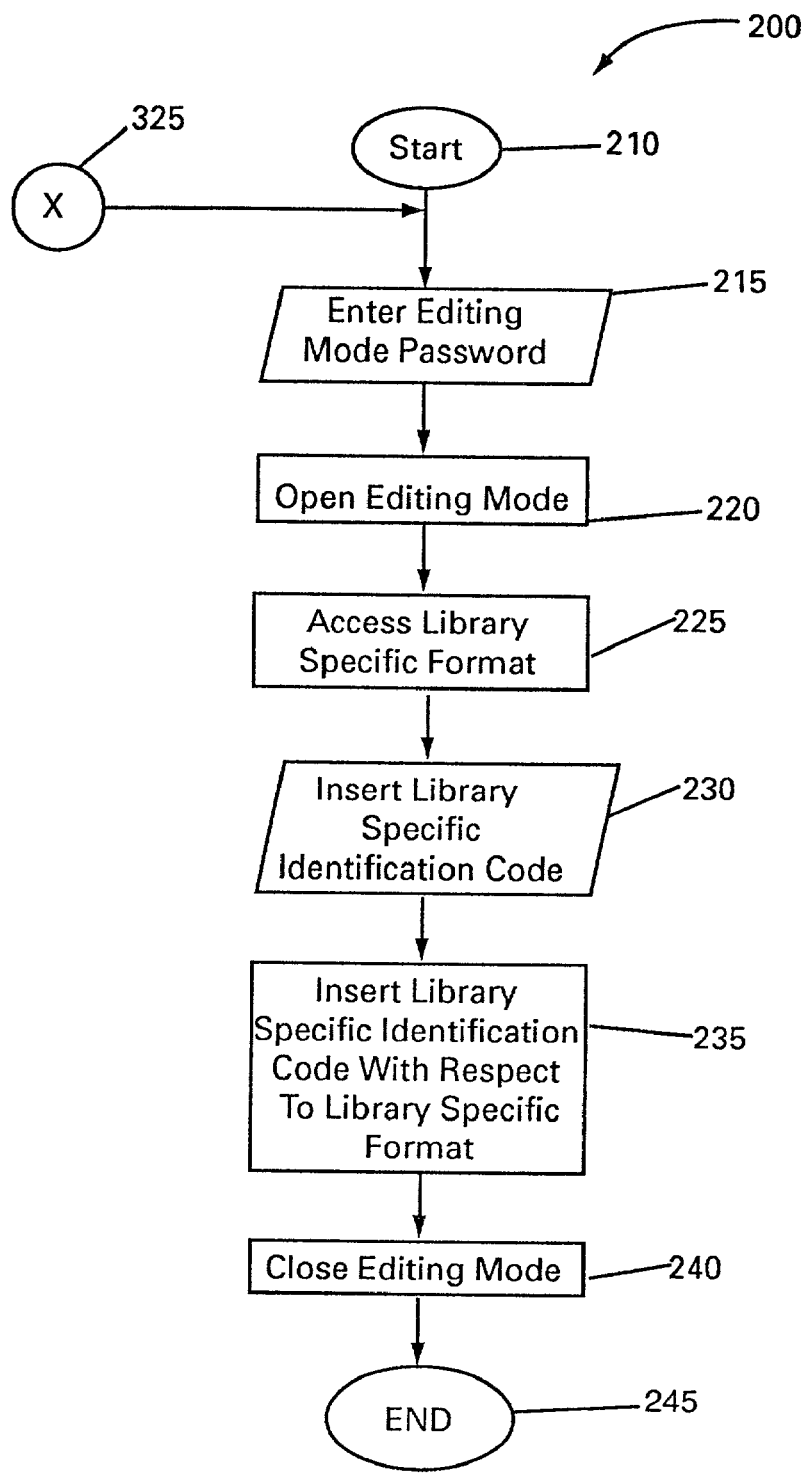
FIG. 4 is a schematic diagram of the editing sequence executed by the network assembly of FIG. 3.
Figure 5:
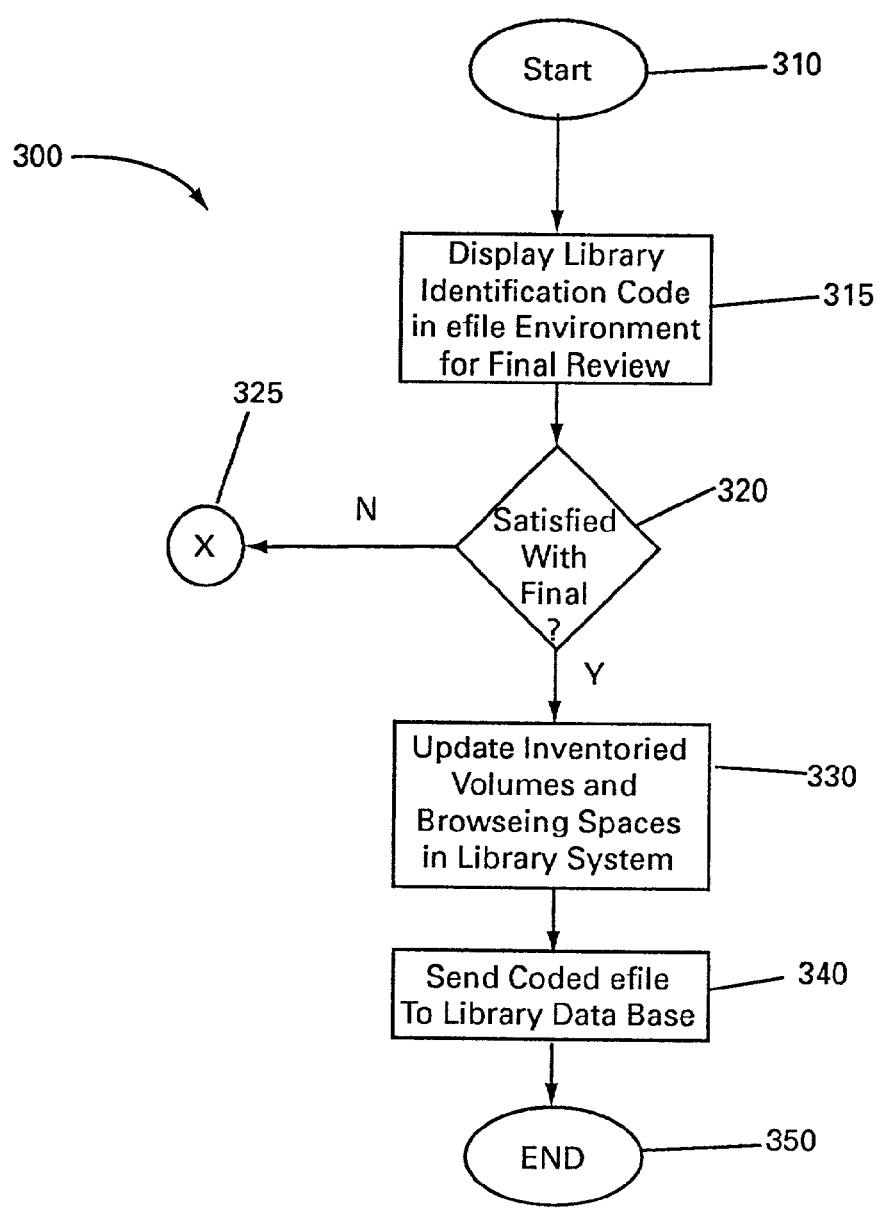
FIG. 5 is a schematic diagram of the review sequence executed by the network assembly of FIG. 3.

After assigning the library specific identification code, the efile is advanced from the indexing unit 100' to the editing unit 200' so as to initiate the editing sequence in step 210 of FIG. 4. In step 210, the editing unit requests an authorized user to enter a password for "editing mode" entry. For example, in the hardware unit embodiment of FIG. 2, an authorized user may be library system personnel who are associated with indexing all incoming published material prior to placing the published material in circulation. Alternatively, authorized personnel are those who are responsible for operating the network assembly 30 as a service to Internet consumers, i.e. library systems who order published materials through the network assembly 30 on the Internet. In step 220, an editing mode is engaged via a correctly entered password from step 215. The central logic unit 31 in the editing mode enables the authorized user to insert the library specific identification code to the electronic file in the reference repository 33 with a specific format authorized by the library system 40. For example, the library in Ohio may call for the identification code on the front cover and last page whereas the library in Spain calls for the code on the spine and first page. As such, the central logic unit in step 225 accesses the library specific format from the library system 40 or, alternatively, from the reference repository 33. Step 230 is preferably provided wherein the authorized user is prompted by the editing unit 200' to insert the library specific identification code although other embodiments contemplate insertion without user input. Step 235 refers to a program sequence for inserting the library specific identification code with respect to the desired format of the library system 40. After insertion, the editing mode is closed in step 240 to restrict further insertions into the efile and, thus, the editing sequence is ended in step 245.

Upon editing, the efile is advanced from the editing unit 200' to the review unit 300' to initiate the review sequence 300 in step 310 of FIG. 5. In step 315, a finalized efile with the library specific identification code is displayed for review by the authorized user. The authorized user is asked in step 320 whether the finalized efile is satisfactory. If the authorized user is not satisfied, the review sequence 300 loops back to start the above mentioned editing sequence 200 for the purpose of correcting the efile to satisfy the authorized user. Otherwise, the central logic unit 31 interfaces with the library system 40 so that the library system 40 can prepare for the incoming efile, such as conducting an inventory or updating library browsing spaces for example. The resulting efile with the library specific identification code in step 340 is electronically forwarded by the central logic unit 31 to the library system 40 before terminating the review sequence in step 350.

Although those of ordinary skill in the art will recognize other variations, the library system 40 of FIG. 1 features published materials in efile format in an electronic library database 47 and in hard copy format in library shelves indicated by the reference numeral 44. The library system 40 also includes the book on demand machine 47 for converting a published material in an efile format to a hard copy format. The book on demand machine 47 is any standard book on demand machine such as for example that of U.S. Pat. No. 6,012,890, entitled "Electronic Bookstore Vending Machine", assigned to InstaBook Corporation of Gainesville, Fla. Illustratively, a library patron wanting a hard copy book would interface with the book on demand machine 47 and select from titles available in efile format on the library database 46. All available efiles on the library database 46 feature a library specific identification code inserted by the network assembly 30 prior to storage in the library database 46. Therefore, on converting each efile, the book on demand machine 47 prints a hard copy format with a library specific identification code included.

While the present invention has been disclosed in connection with the preferred embodiments thereof, it should be understood that there may be other embodiments which fall within the spirit and scope of the invention as defined by the following claims.

The invention claimed is:

1. A system for coding an electronic file, comprising:
   a reference repository, wherein the reference repository receives the electronic file and characteristic information associated with the electronic file from a communications network and stores the characteristic information in a memory;
   an indexing unit linked with the reference repository, wherein the indexing unit assigns a classification code to the electronic file based on the characteristic information, assigns an inventory code to the electronic file based on whether the electronic file already exists in the system, and compiles an identification code for the electronic file from the classification code and the inventory code; and
   an editing unit linked with the reference repository and the indexing unit, wherein the editing unit inserts the identification code to the electronic file.

2. The system according to claim 1 wherein the communications network comprises the Internet.

3. The system according to claim 1 wherein the electronic file comprises published material.

4. The system according to claim 1 wherein the indexing unit assigns the identification code to the electronic file with respect to the characteristic information.

5. The system according to claim 1 wherein the indexing unit stores the identification code with respect to the characteristic information.

6. The system according to claim 1 wherein the electronic file represents a publication, and wherein the characteristic information includes at least one of a title, an author, a publisher, a format, a copyright, an International Standard Book Number (ISBN), and a number of pages of the publication.

7. A system for coding an electronic file for a library, comprising:
   a reference repository associated with the library, wherein the reference repository receives the elecironic file and characteristic information associated with the electronic file from a communications network and stores the characteristic information in a memory;

an indexing unit linked with the reference repository, wherein the indexing unit assigns a library-specific classification code to the electronic file based on the characteristic information and procedures of the library, assigns a library-specific inventory code to the electronic file based on whether the electronic file already exists in the library, and compiles a library-specific identification code for the electronic file from the library-specific classification code and the library-specific inventory code; and an editing unit linked with the reference repository and the indexing unit, wherein the editing unit inserts the library-specific identification code to the electronic file.

8. The system according to claim 7 wherein the editing unit formats the library-specific identification code as authorized by the library.

9. The system according to claim 8 further comprising a review unit linked with the indexing unit, wherein the review unit facilitates review of the formatted electronic file.

10. The system according to claim 9 wherein thereview unit dispatches the formatted electronic file to a book on demand machine.

11. The system according to claim 7 wherein the electronic file represents a publication, and wherein the characteristic information includes at least one of a title, an author, a publisher, a format, a copyright, an International Standard Book Number (ISBN), and a number of pages of the publication.

12. A computer-implemented method for coding an electronic file, comprising:

receiving an electronic file and characteristic information associated with the electronic file from a communications network, and storing the characteristic information in a memory;

assigning a classification code to the electronic file based on the characteristic information;

assigning an inventory code to the electronic file based on whether the electronic file is a copy of an existing electronic file;

compiling an identification code for the electronic file from the classification code and the inventory code; and inserting the identification code to the electronic file.

13. The computer-implemented method according to claim 12 wherein the electronic file represents a publication, and wherein the characteristic information includes at least one of a title, an author, a publisher, a format, a copyright, an International Standard Book Number (ISBN), and a number of pages of the publication.

14. A computer-implemented method for coding an electronic file for a library, comprising:

receiving an electronic file and characteristic information associated with the electronic file from a communications network, and storing the characteristic information in a memory;

assigning a library-specific classification code to the electronic file based on the characteristic information and procedures of the library;

assigning a library-specific inventory code to the electronic file based on whether the electronic file is already in the library;

compiling a library-specific identification code for the electronic file from the library-specific classification code and the library-specific inventory code; and inserting the library-specific identification code to the electronic file.

15. The computer-implemented method according to claim 14 wherein the electronic file represents a publication, and wherein the characteristic information includes at least one of a tide, an author, a publisher, a format, a copyright, an International Standard Book Number (ISBN), and a number of pages of the publication.

* * * * *

UNITED STATES PATENT AND TRADEMARK OFFICE
CERTIFICATE OF CORRECTION

| | |
|---|---|
| PATENT NO. | : 7,305,416 B2 |
| APPLICATION NO. | : 09/747219 |
| DATED | : December 4, 2007 |
| INVENTOR(S) | : Alejandro Wiechers |

It is certified that error appears in the above-identified patent and that said Letters Patent is hereby corrected as shown below:

In column 6, line 66, in Claim 7, delete "elecironic" and insert -- electronic --, therefor.

In column 7, line 22, in Claim 10, delete "thereview" and insert -- the review --, therefor.

In column 8, line 34, in Claim 15, delete "tide" and insert -- title --, therefor.

Signed and Sealed this

Twenty-ninth Day of July, 2008

JON W. DUDAS
*Director of the United States Patent and Trademark Office*